United States Patent
Hastbacka

[11] 4,297,588
[45] Oct. 27, 1981

[54] ELECTRO-OPTICAL LEVEL

[76] Inventor: Albin A. Hastbacka, 3 Singlefoot Rd., Chelmsford, Mass. 01824

[21] Appl. No.: 9,853

[22] Filed: Feb. 6, 1979

[51] Int. Cl.³ .............................................. G01N 15/06
[52] U.S. Cl. ............................... 250/577; 128/214 E; 73/293
[58] Field of Search ................... 250/577; 128/214 E; 73/293

[56] References Cited
U.S. PATENT DOCUMENTS
4,223,231  9/1980  Sugiyama .......................... 250/577

Primary Examiner—David C. Nelms
Assistant Examiner—Darwin R. Hostetter

[57] ABSTRACT

A U-shaped device wherein the presence or absence of a transparent liquid or solid between the legs of the U is sensed. The device utilizes a collimated light source mounted in one leg of the U with an associated limited field of view sensor in the other leg of the U-shaped device. The light source is placed so as to cause the transmitted light beam to strike the surface of the material to be sensed at an angle which is substantially off of a line perpendicular to the surface of the sensed material.

The light sensor is placed so as to receive the light beam when there is no liquid or solid material present between the source and the sensor and to prevent the refractively bent light beam from striking the sensor when a transparent liquid or solid is placed between the light source and sensor.

The presence or absence of a transparent liquid or solid between the light source and sensor is indicated by an electronic circuit which provides current pulses to drive the light source and amplifies the light sensor current sufficiently to be able to drive a visible light emitting diode or acoustic warning device.

3 Claims, 4 Drawing Figures

ELECTRO-OPTICAL LEVEL

BACKGROUND OF THE INVENTION

The use of an infrared beam and associated photo sensor is well known for measuring the level of opaque liquids and solids. The devices of this type are generally limited to use with opaque liquids and solids and are not suitable for use with transparent materials.

In many applications, the detection of the level of a liquid or solid is required for materials which are either transparent or opaque.

An apparatus in the prior art which will detect transparent or opaque liquids is described in U.S. Pat. No. 3,636,360 issued Jan. 18, 1972. This technique is limited to liquids contained within tubes, and is not suited for application where the liquid is contained within a flexible plastic bag or other non-rigid container.

Thus, there exists a need for a device which can be used to detect the level of a transparent or opaque solid or liquid in a non-rigid container.

SUMMARY OF THE INVENTION

The invention is a U-shaped device wherein the presence or absence of a liquid or solid between the legs of the U is sensed. The invention utilizes a collimated infrared source mounted in one leg of the U with an associated limited field of view sensor in the other leg of the U. The infrared source is placed so as to cause the light beam to strike the surface of the material to be sensed at an angle which is approximately 60° from perpendicular. The sensor is placed to receive the light beam when there is no liquid or solid material present between the source and the sensor and to prevent the refractively bent light beam from striking the sensor when a transparent liquid or solid is placed between the light source and sensor.

The invention will become more apparent upon reading the following detailed description in conjunction with the drawings in which:

FIG. 1 generally illustrates the device according to the invention and shows the top view of the mechanical arrangement of the source and sensor within the device.

DETAILED DESCRIPTION

Figure 1:
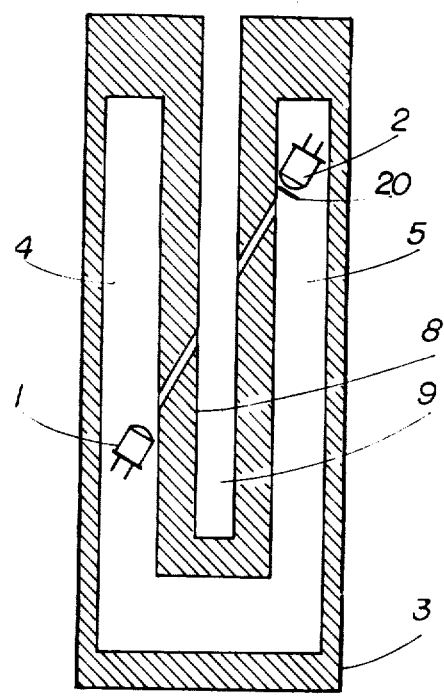
Figure 2:
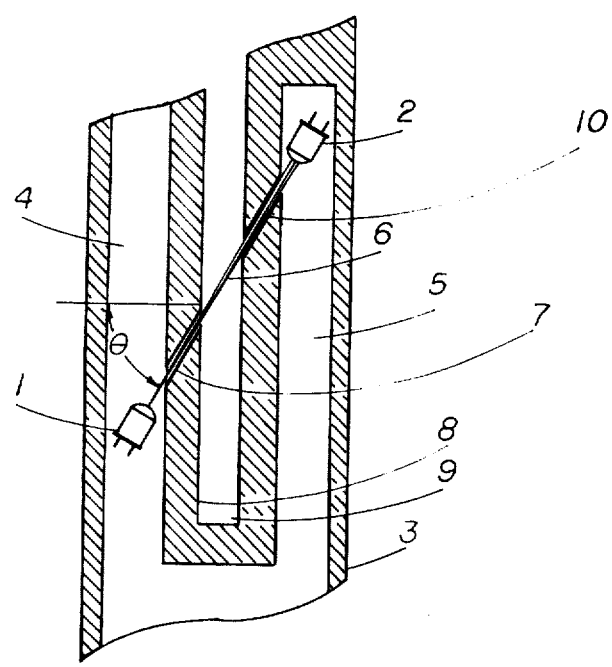
FIG. 2 shows the path of the light beam in the absence of any liquid or solid.

In accordance with the teaching of the invention, the apparatus utilizes a light source 1 and a light sensor 2 mounted within a U shaped device 3 as shown in FIG. 1 and FIG. 2. The device 3 has a light source 1 mounted within one leg 4 of the U and a sensor 2 in the other leg 5 of the U. The light source 1 is placed so that the light beam 6 emanating from one leg 4 of the U impinges upon the surface of the material to be sensed, at an angle $\theta$ of approximately 60°, from a line which is perpendicular to the surface. The sensor 2 is placed in line with the light beam 6 so that in the absence of a liquid or solid, the sensor 2 is illuminated by the light beam 6.

When a transparent liquid or solid is placed between the source 1 and the sensor 2, the light beam 6 emanating from the source 1 is bent by refraction upon passing through the liquid or solid surface and exits the sensed material from a point where the light beam 6 does not illuminate the sensor 2.

In the preferred embodiment of the invention, as shown in FIG. 2, the light source 1 is an infrared emitting diode and the sensor 2 is a phototransistor. The light beam 6 from the source 1 passes through an aperture 7 which is either a rectangular slot or a cylindrical tunnel. The aperture 7 is made small enough to limit the divergence of the light beam 6 to a narrow angle. The aperture 7 is also small enough so that if a plastic bag containing a liquid is placed within the slot 9 of the device 3, the surface of the bag does not appreciably penetrate the aperture 7 and remains nearly parallel with the inside surface 8 of the U shaped device 3. The light beam 6 from the source 1 passes through the aperture 7 and the narrow angle main portion of the beam 6 passes through the opening 7 in the device 3 and passes through a similar aperture 10 which lies in front of the sensor 2. The sensor aperture 10 prevents most ambient light from striking the sensor 2 but allows the narrow angle infrared beam 6 to illuminate the sensor 2 when there is no liquid or solid to be sensed within the slot 9 of the device 3. The relative geometry of the source 1, apertures 7, 10, light beam 6, and sensor 2 is shown in FIG. 2 for the case where there is no material to be sensed within the slot 9 of the device 3.

Figure 3:
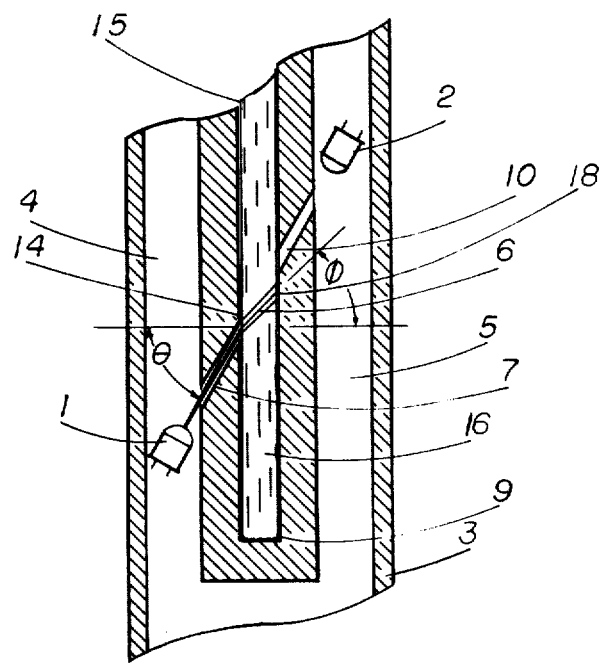
FIG. 3 shows the path of the light beam in the presence of a transparent liquid whose top surface is parallel to the light beam.

FIG. 3 shows the geometry of the source 1, light beam 6, and sensor 2 when a clear liquid 16 within a thin plastic bag 15 is placed within the slot 9 of the device 3. According to Snell's law, the angle $\theta$ of the light beam 6 will change upon striking the surface 14 of the clear liquid 16. For the case where the plastic container 15 for the liquid 16 is thin compared to the width of the slot 9, the approximate angle of the light beam will change from the incident angle $\theta$ of 60° to an angle $\phi$, whose sine is (N1/N2)×sine 60°, as it passes through the liquid. For the case where N1=1 (air) and the material 16 to be sensed is liquid water, N2=1.33, $\phi$=40.5°, the light beam 6 will pass through the slot 9 with the geometry as shown in FIG. 3. The light beam 6 exits the sensed material 16 on the sensor side 5 of the device 3, but at a point 18 where the light beam will not pass through the sensor aperture 10. The sensor 2, therefore, does not become activated when there is a transparent liquid within the slot 9.

In a typical implementation, the aperture 7 is small enough to limit the divergence angle of the light beam 6 as it exits the aperture 7 to be ±5° or less. For the situation where the main angle of the light beam 6 is 60° with a divergence of ±5°, the light beam 6 passes through the water with a main angle of 40.5° with a divergence of +2.3° and −2.6°. The sensor aperture 10 is positioned along the leg 5 of the device 3 so that none of this slightly divergent light beam 6 will strike any of the sensor aperture 10 as shown in FIG. 3.

For operation in a high ambient light environment, an infrared filter 20 is placed in front of the sensor 2 as shown in FIG. 1 to filter out most of the ambient light but allow most of the infrared light beam 6 to pass through to the sensor 2.

Figure 4:
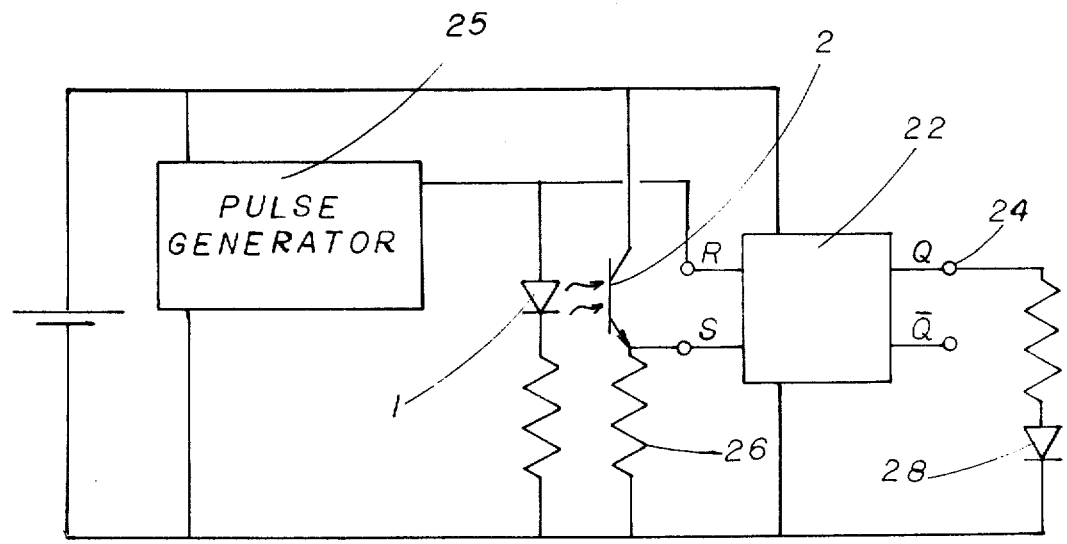
FIG. 4 shows a typical electronic schematic for a circuit which drives the source, detects the light beam, and provides a visible or audible indication of the presence of a liquid or solid between the light source and sensor.

FIG. 4 provides a schematic for a typical driver 25, receiver 2, and indicator 28 for the invention. The circuit shown in FIG. 4 provides pulsed operation of the infrared source 1 to minimize the drive power requirements of the device 3. The infrared diode 1 is pulsed with a 10 milliampere current for approximately a two milliseconds period every 0.1 seconds. The output of the phototransistor detector 2 is used to drive a CMOS flip flop 22. When the drive pulse is present at the infrared source 1, it is also used to reset the flip flop 22. If the detector resistor 26 does not provide sufficient output voltage (the case when there is clear liquid or solid in the slot 9), the flip flop 22 remains in the reset condition. For the case where there is no liquid or solid material in the slot 9, the pulse driving the infrared source 1 will reset the flip flop 22, but the light beam illuminating the sensor 2 will cause the phototransistor 2 to set the flip flop 22. The output 24 of the flip flop 22 is used to control the current flowing through a visible light emitting diode 28 or acoustic warning device. The light emitting diode 28 or acoustic warning device will be on when there is no material in the slot 9 of the device. The circuit shown in FIG. 4 is presented as an illustration only because other embodiments can readily be implemented by one skilled in the art.

The invention as described heretofore discusses the operation when a clear liquid or solid is placed within the slot 9, but it should be readily apparent that placing an opaque liquid or solid within the slot 9 will block the light beam 6 from the detector 2 and will therefore also be detected.

The preferred embodiment utilizes an incident angle $\theta$ of 60°, in order to provide substantial tolerances in the size and location of the sensor aperture 10, but it should be readily apparent that the device can be fabricated with other incident angles $\theta$ by one skilled in the art.

The U shape of the device in the preferred embodiment allows the device, when constructed in suitable sizes and weights, to be hung on plastic bags where it is desired to detect the level of the liquid passing through a reference level, such as in a plastic intravenous bag. It should be obvious that the invention also applies to the case where there are two parallel surfaces housing the light source 1 and the detector 2 instead of the legs of the U.

By utilizing a plurality of light sources and light sensors, the level of the solid or liquid within the device may be indicated to any desired resolution.

What is claimed is:

1. A level indicating device comprising:

a device with two legs joined at one end wherein said legs are spaced to form a slot within which a solid or liquid in a container is capable of being placed;

a collimated light source within one leg of said device which is directed to fall upon a light sensor in the second leg of said device in the absence of a solid or liquid in a container within said slot wherein the collimated light beam from said light source is positioned to strike a transparent solid or transparent liquid in a transparent container, inserted into said slot of said device, at an angle which is substantially off of a line perpendicular to the surface of said inserted solid or liquid container so that the refracted light beam passing through said transparent solid or liquid container will not fall upon said light sensor in the presence of said transparent solid or transparent liquid in transparent container;

a pair of rectangular slots or cylindrical tunnels which aperture limit the light beam emanating from said light source and the received light beam falling upon said light sensor;

means for exciting said light source;

means for detecting the presence or absence of said light beam falling upon said light sensor so as to provide a visible or audible indication of the presence or absence of said solid or liquid between said light source and light sensor.

2. A level indicating device as in claim 1 wherein the light sensor is shielded from ambient light by placing an infrared filter in front of said sensor to filter out a high percentage of the ambient light while allowing a majority of the infrared light from the light source to pass through the filter to said light sensor.

3. A level indicating device as in claim 1. wherein the device is of suitable size and weight so that the device will hang on a plastic bag containing a liquid.

* * * * *